United States Patent
Jordan et al.

(10) Patent No.: US 8,589,116 B2
(45) Date of Patent: Nov. 19, 2013

(54) OBJECT SENSOR

(75) Inventors: Ruediger Jordan, Stuttgart (DE); Iris Nadine Reiter, München (DE)

(73) Assignee: Robert Bosch GmbH, Stuttgart (DE)

( * ) Notice: Subject to any disclaimer, the term of this patent is extended or adjusted under 35 U.S.C. 154(b) by 247 days.

(21) Appl. No.: 12/949,433

(22) Filed: Nov. 18, 2010

(65) Prior Publication Data

US 2011/0153268 A1    Jun. 23, 2011

(30) Foreign Application Priority Data

Dec. 17, 2009   (DE) .......................... 10 2009 054 835

(51) Int. Cl.
*G01C 9/00*    (2006.01)
*G01B 21/22*   (2006.01)
*G06F 19/00*   (2011.01)

(52) U.S. Cl.
USPC .............................. 702/151; 33/533; 701/31.7

(58) Field of Classification Search
USPC ............... 702/151, 33, 35–36, 40, 81, 84–85, 702/90–95, 97, 104–105, 127, 150, 702/152–153, 155–159, 179–180, 182–183, 702/185, 189–190; 701/1, 29.1, 29.7, 701/30.7–30.9, 31.1, 31.7, 33.1, 33.7–33.9, 701/63, 300, 534–535, 32.3, 32.5; 33/1 N, 33/533–534
See application file for complete search history.

(56) References Cited

U.S. PATENT DOCUMENTS 7,012,560 B2    3/2006   Braeuchle et al. ............... 342/70
2002/0183928 A1*  12/2002  Winter et al. ................. 701/300

FOREIGN PATENT DOCUMENTS

DE      10149115      4/2003
DE      10215673      10/2003
DE      102005013146  9/2006

OTHER PUBLICATIONS

Hundelshausen et al., Driving with Tentacles: Integral Structures for Sensing and Motion, 2008, Journal of Field Robotics 25(9), pp. 640-673.*

* cited by examiner

*Primary Examiner* — Toan Le
(74) *Attorney, Agent, or Firm* — Kenyon & Kenyon LLP

(57) ABSTRACT

A method for determining an object angle, especially for a driver assistance system in a motor vehicle, includes the steps of determining directional angles of the object with respect to two sensors, determining the object angle based on the directional angles, determining a cross-misalignment angle as the difference of the determined directional angles, determining a validity signal indicating the validity of the object angle based on the cross-misalignment angle and compensating for the influence of a relative misalignment of the sensors on the determined object angle based on the cross-misalignment angle.

16 Claims, 4 Drawing Sheets

OBJECT SENSOR

CROSS REFERENCE

The present application claims the benefit under 35 U.S.C. §119 of German Patent Application No. 102009054835.1 filed on Dec. 17, 2009, which is expressly incorporated herein by reference in its entirety.

FIELD OF THE INVENTION

The present invention relates to a technique for recording an object angle. The present invention particularly relates to a method and a device for determining an object angle for a driver assistance system in a motor vehicle.

BACKGROUND INFORMATION

Increasingly, motor vehicles are being equipped with driver assistance systems, which support and relieve the load on the driver of the motor vehicle. Examples of such assistance systems include the ACC system (adaptive cruise control) for speed control or a PSS system (predictive safety system) for farsighted vehicle control, which may include, for example, a PBA system (predictive brake assist) for farsighted brake support, or a PEB system (predictive emergency braking) for farsighted brake activation.

Such driver assistance systems require sensors, with the aid of which the surroundings of the motor vehicle is able to be scanned for objects which could require influence on braking. Such sensors may include the processing of measured data, or the provision of raw data that are processed at a different location. Radar sensors, lidar sensors, ultrasonic sensors and optical sensors may be used individually or in combination with one another, for different distance ranges or directional ranges.

When several sensors are used (also of different technologies) it is possible to improve the accuracy and/or the integrity of the determined position of the object; based on redundant data. German Patent Application No. DE 101 49 115 A1 describes a technique for checking object measurements, carried out by several sensors, for consistency.

The sensors used are usually connected rigidly to the motor vehicle, and are thus safeguarded from misalignment (rotation with respect to the motor vehicle. A gradual misalignment with respect to the motor vehicle, that is progressive over a longer period of time, is improbable according to past experience. However, the misalignment of a sensor may occur, for example, by a relatively slight influence of an external object on the motor vehicle or its attachment parts, perhaps by a light collision, which may take place during parking or leaving a parking space. If a sensor is misaligned, the accuracy of the determination of the position of the object may be impaired, so that, under certain circumstances, a postconnected driver assistance system is not able to fulfill its task satisfactorily or at all.

Conventional techniques for detecting the misalignment of a sensor on a motor vehicle, and for compensating for it are available. Many of these techniques require an extensive learning phase, so as reliably to detect a misalignment of a sensor that has occurred.

SUMMARY

An object of the present invention is to provide an improved technique for detecting, and, if necessary, compensating for a misalignment of such a sensor.

A first example aspect of the present invention includes a method for determining an object angle, especially for a driver assistance system in a motor vehicle, the steps of determining directional angles of the object with respect to two sensors, of determining the object angle based on the directional angle, of determining a cross-misalignment angle as the difference of the determined directional angles, of determining a validating signal indicating the validity of the object angle based on the cross-misalignment angle and compensating for the influence of a relative misalignment of the sensors on the determined object angle based on the cross-misalignment angle. The object angle, in this context, is the angle at which the object appears in a common reference system of both sensors. The sensors may be mounted on a motor vehicle, and the reference system may be defined with respect to the motor vehicle.

Based on the cross-misalignment angle, both the detection of an existing misalignment and compensating for it are able to be improved. The cross-misalignment angle, in particular, permits determining the presence of a misalignment, independently of compensation for it, in a rapid and reliable manner. To determine a relative misalignment, measurements may be used both on an immovable and on a movable object, such as a preceding motor vehicle. The compensation is able to take place directly based on the cross-misalignment angle, for instance, in the form of a compensation of the object angle by the cross-misalignment angle by an angle addition. The compensation may also be indirectly based on the determined cross-misalignment angle, for instance, by initiating a conventional compensation method or by changing parameters of a conventional compensation method in a targeted fashion. The postconnected system may be deactivated using the validity signal, until the misalignment compensation has taken place at a sufficient quality. At first, only a relative misalignment is determined, in this instance, that is, the rotation of a sensor with respect to the other one. During the further course of the technique presented, a rotation of both sensors in the same direction may also be compensated for.

The sensors may be at a distance with respect to each other, and in order to determine the directional angle, the directional angles recorded by the sensors may be transposed into a common reference system. It is generally desirable for geometrical reasons to maximize a base line between the sensors, transversely to the direction of motion of a reference system (of a motor vehicle), so that the sensors on a motor vehicle are frequently mounted front left and front right. In order to be able to compare to each other the directional angles determined by the sensors, a point of origin of a common reference system (coordinate system may be defined, for example, on the base line connecting the sensors on the center axis of the motor vehicle. The transposing takes place while knowing the position of the sensors with respect to the common reference system, and may be carried out efficiently, for instance, using matrix operations.

The validity signal may be determined using a histogram filter. The histogram filter classifies incoming cross-misalignment angles in the value range and manages the counter readings of the bins assigned to the value ranges. The validity signal may be determined with the aid of different observed magnitudes at the histogram filter. Filtering using a histogram filter does not require measurements at a distance in time, but the filtering speed is mainly a function of measuring frequency, so that the determination is able to be carried out quickly and reliably. The determination of the validity signal may include a comparison with a predetermined threshold value.

The validity signal may be determined on the basis of the bin of the histogram filter filled up the highest, a change in the bin filled up the highest or a rate of change in the filling status of one of the bins. The forming of the validity signal may also include a combination of these magnitudes. Additional observations at the histogram filter may also come in, for instance, the filling ratio of the entire histogram filter, in order to avoid a faulty validity signal in an initial phase of the method. Furthermore, the distribution of the filling of all bins of the histogram filter may also be evaluated to form the validity signal.

The validity signal may also be determined using a low-pass filter. The low-pass filter may include a circulating memory, for instance, with the aid of which a moving average of a predetermined number of past cross-misalignment angles is determined.

Based on the object angles of the same object at different positions with respect to the reference system of the sensors, one is able to determine a compensation angle. The object may be a roadway marking, for instance, or a street sign whose directional angles are determined at different distances from the motor vehicle. A compensation angle may be determined based on the change in the directional angles determined, which either has reference to a directional angle of one sensor or is based on the values of the object angle determined by both sensors. This procedure is able to supplement or support the detection and/or compensation of a misalignment of a sensor, based on the cross-misalignment angle.

After the compensation, a further processing of the determined directional angles may take place as if there were no misalignment.

The object angle may be determined as an average of the transposed directional angles. In the case of a misalignment of only one sensor, the misalignment angle thus enters only by one-half into the determined object angle, whereby the determined object angle is able to remain usable, perhaps for a postconnected driver assistance system.

According to a second example aspect of the present invention, the device for determining an object angle, especially for a driver assistance system in a motor vehicle, includes two sensors for determining directional angles of the object, a processing device for determining the object angles based on the directional angles determined, a subtraction device for determining a cross-misalignment angle from the directional angles determined, a validator for determining a validity signal indicating the validity of the object angle based on the cross-misalignment angle and a compensator for compensating for the influence of a relative misalignment of the sensors to the object angle determined, based on the cross-misalignment angle.

The device may be a component of a radar sensor integrated into a processing device, for instance, perhaps a long range radar (LRR). This may include one or more sensors.

The sensors may be at a distance from one another, and the device may include a transposing apparatus for transposing directional angles, recorded by the sensors, into a common reference system. This simplifies further processing of the transposed directional angles by other systems.

The validator of the device may include a histogram filter as described above.

The design approach provided will now be described in more detail with reference to the figures.

DETAILED DESCRIPTION OF EXAMPLE EMBODIMENTS

Designations for different angles include those below:
directional angle: an angle to the object determined by a sensor L, R.
object angle: the actual angle at which an object appears in a common coordinate system.
angle of misalignment: the angle by which one of sensors L, R is rotated with respect to the common coordinate system.
object hypothesis: the angle of the object determined by the overall system in the common coordinate system.
cross-misalignment angle: the difference of transposed directional angles.
system angle: the difference between the coordinate system formed from the directional angles of the sensors L, R and the coordinate system of the vehicle.
compensation angle: the determined approximation to a misalignment angle.

Figure 1:
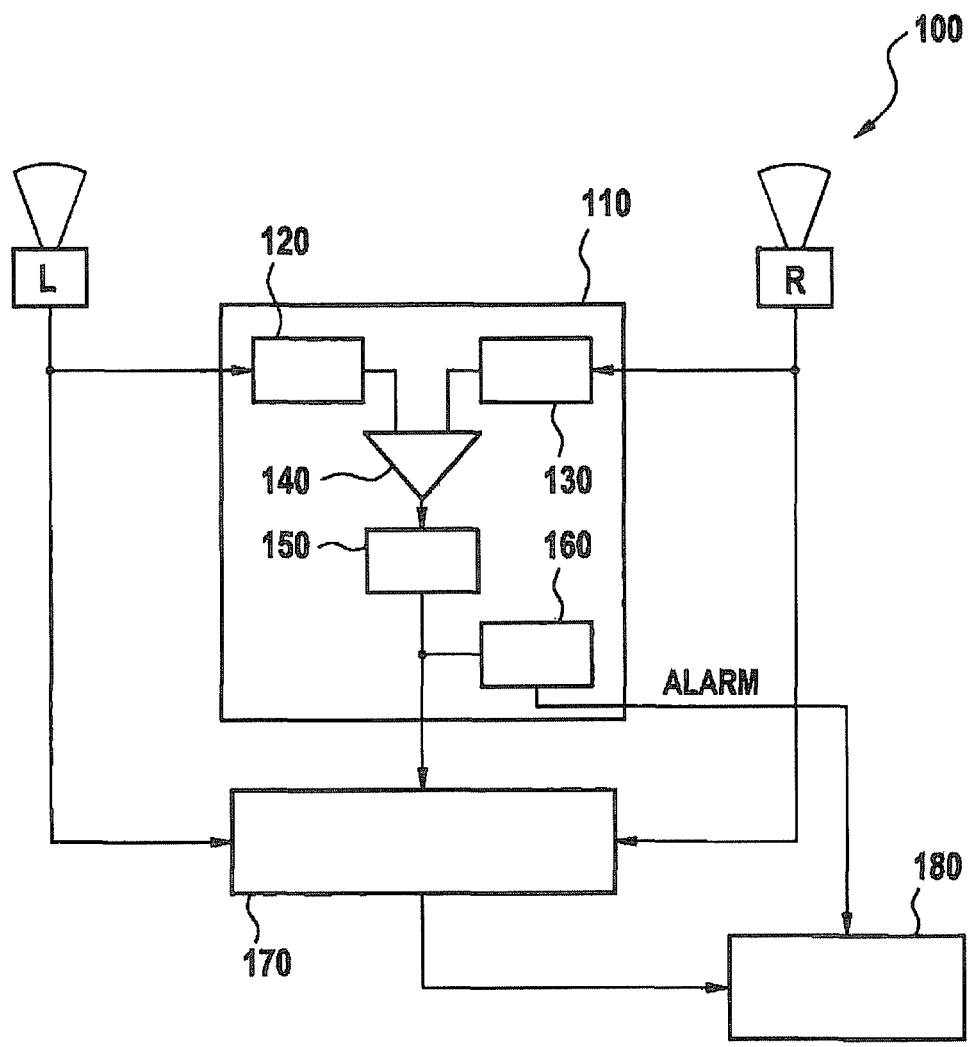
FIG. 1 shows a block diagram of a device for determining an object angle.

FIG. 1 shows a block diagram of a device 100 for determining an object angle having a postconnected driver assistance system 180. In each case, two sensors L and R determine a directional angle of an object (not shown), which is located in a common measuring range of sensors L and R. Sensors L and R are at a distance from each other, so that, in general, the directional angles of sensors L and R with respect to the same object are different. In addition, sensors L and R are able to provide a distance measurement from the object. Sensors L and R are connected to adjustment device 110, in order to provide it with measured values.

Adjustment device 110 includes a first transposing device 120 and a second transposing device 130, which is connected to a subtraction device 140, also a filter 150 and a comparator 160 that is connected to the filter. Transposing devices 120 and 130 each carry out a transformation of the determined directional angles, by converting the directional angle determined to a common coordinate system, and by thus making measured values of different sensors L, R comparable to each other. From the transposed measured values, subtraction device 140 forms a cross-misalignment angle by subtraction, which it provides to filter 150.

Filter 150 may be a histogram filter or a low-pass filter. The cross-misalignment angle states by what angular amount sensors L and R are rotated or misaligned with respect to each other. In filter 150, the cross-misalignment angle is made insensitive to noise, erroneous measurements and other interfering influences. Filter 150 may be designed in such a way that the cross-misalignment angle already reflects a relative misalignment of sensors L and R quite soon after the occurrence of the misalignment. As an example, the time that passes between a misalignment of one of sensors L and R and a corresponding change in the validity signal, may generally be a function of the measurement frequency of sensors L and R, and not of a distance in time between the measurements or a change in the geometrical relationships between the object and the sensors between measurements.

Comparator 160 controls one or more parameters of filter 150, and emits a fault signal ("ALARM") when the parameter or parameters point to a cross-misalignment angle that is exceeding a predetermined threshold value. In the case of a histogram filter for filter 150, this parameter may, for instance, be the highest filled bin of the histogram filter or the one having the strongest growth rate. Based on the fault signal, for instance, a driver assistance system (180) that is postconnected to device 100 may be deactivated as long as the integrity of the object angles recorded based on sensors L and R is not ensured. Alternatively or in addition, the fault signal of comparator 160 may be emitted in the form of an acoustical or optical warning to a driver of the motor vehicle, or in the form of an entry in a fault memory (not shown).

Based on the measurements of sensors L and R and of the cross-misalignment angle of adjustment device 110, processing device 170 determines an object hypothesis, which it provides to driver assistance system 180. Processing device 170 may be equipped to compensate for a relative misalignment of a sensor L or R, to which the cross-misalignment points, by determining compensation angles for sensors L and R. The directional angles determined by sensors L, R are then each corrected by the compensation angle, using processing device 170. The compensation angle of each sensor L, R is equivalent to one-half the cross-misalignment angle plus the system angle, however, the compensation angles for the two sensors L, R have different signs.

Figure 2:
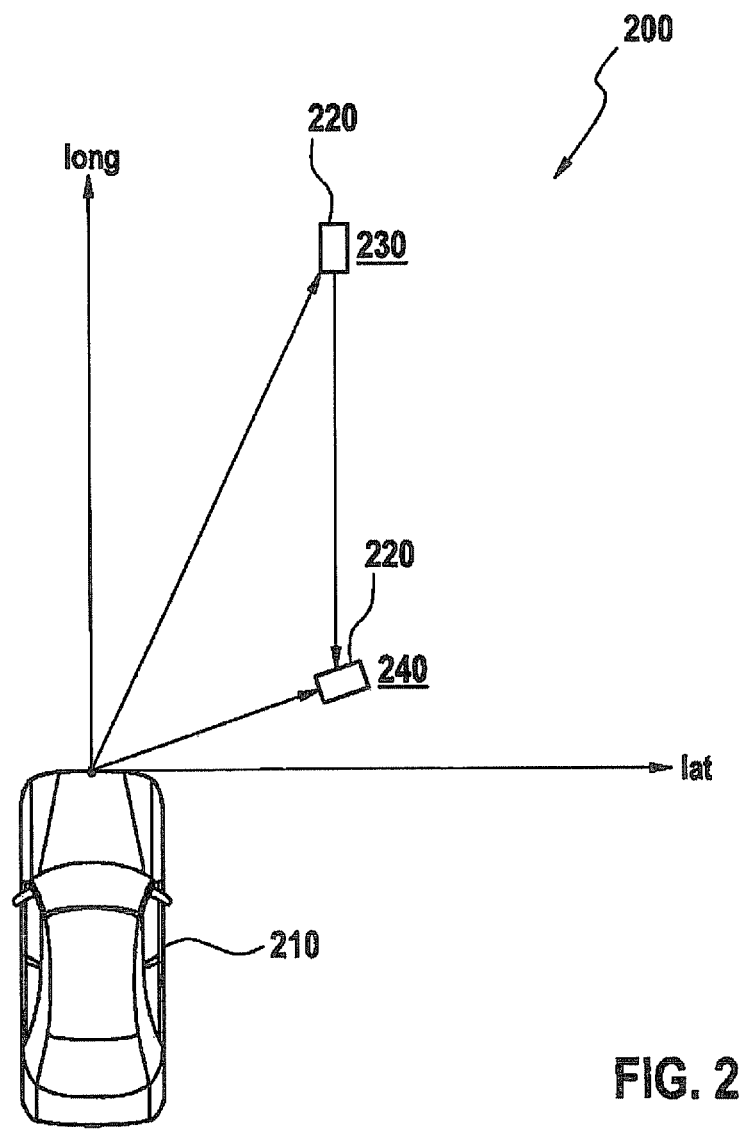
FIG. 2 shows a graphical representation of a misalignment compensation, as it may be carried out by the processing device in FIG. 1.

FIG. 2 shows a graphic illustration 200 of a misalignment compensation for processing device 170 of FIG. 1. One technique for the compensation for static faults is described in German Patent Application No. DE 102 15 673 A1.

A common coordinate system (lat, long) is defined on a motor vehicle 210. The origin of the coordinate system is located on the longitudinal axis of motor vehicle 210, at its front end. The longitudinal axis (long) of the coordinate system points forward in the driving direction, and the lateral axis (lat) is perpendicular to the longitudinal axis and points to the right. An object 220 is first located, with respect to motor vehicle 210, at a first position 230 and later at a second position 240. This is synonymous with a stationary object 220, such as a traffic sign or a roadway guide pole, with respect to which vehicle 210 is moving.

The distance of object 220 along longitudinal axis (long) between positions 230 and 240 may be determined with the aid of knowing the movement of vehicle 210. In addition to the directional angle, that was determined for first position 230, a directional angle for second position 240 may be predicted based on the movement. If the predicted directional angle does not agree with the directional angle determined for second position 240, there either exists a movable object 220 or the sensor by which the directional angle was determined is misaligned with respect to motor vehicle 210 (rotated). From the extent of the lacking agreement, a compensation angle is able to be determined which, together with the determined object angle, gives the actual object angle.

In the case of a system having a plurality of sensors, the above description relate to the determinations of the entire system.

The sketched misalignment compensation presupposes that motor vehicle 210 moves in a known manner and that a stationary object 220 is available for the measurements. Since positions 230 and 240 have to be at a certain distance from each other along the longitudinal axis, so that the misalignment angle determination can be carried out, it may be necessary, in the case of a slow speed of motion of motor vehicle 210, to evaluate measurements that are far apart in time, as a result of which the misalignment angle, that is to be determined, cannot be determined at all for a long time or cannot be determined accurately. During this time period, under certain circumstances, it is not known whether there is a misalignment at all, or whether it exceeds a tolerably threshold value.

Figure 3A:
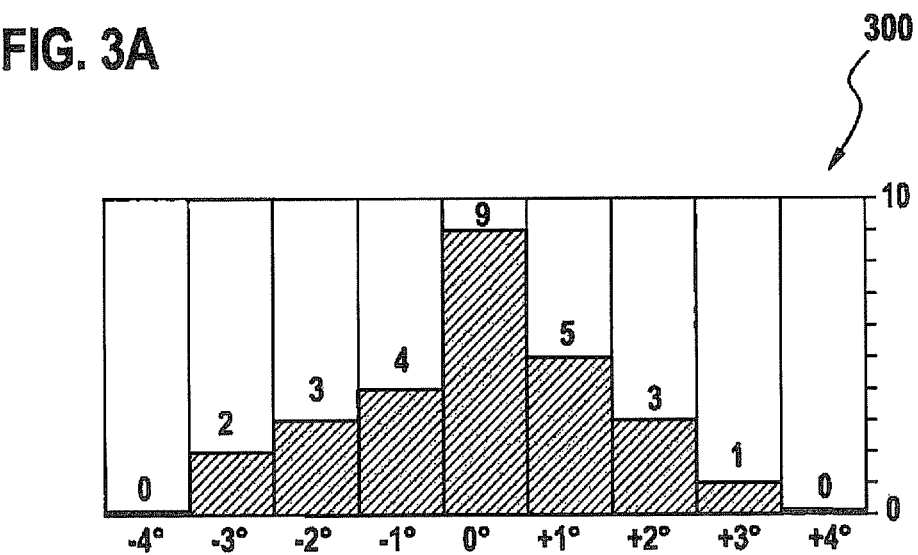
FIGS. 3a and 3b show illustrations of a histogram filter for use in the device in FIG. 1.
Figure 3B:
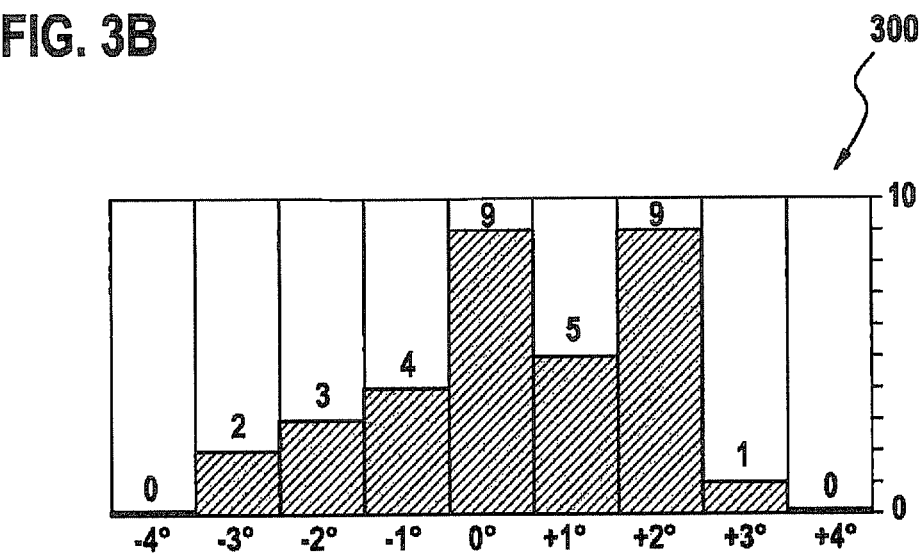

FIGS. 3a and 3b show illustrations of a histogram filter 300 for use as filter 150 in device 100 in FIG. 1. Histogram filter 300 includes nine bins, which are shown having different filling statuses between 0 and 10 (also shown graphically). Angle markings under the bins designate middle values of ranges into which the angle markings fall that are counted in the respective bin. The subdivision of the bins and the maximum counter reading in this figure are purely illustrational.

Cross-misalignment angles arriving from subtraction device 140 in FIG. 1 are assigned, in histogram filter 300, to the bin whose angle marking is at the lowest distance from the cross-misalignment angle. A counter reading in the respective bin is then incremented by 1. In another specific embodiment, the respective bin may also be incremented by 2, and the adjacent bins each by 1, in order to take into account noise in the measured values and measuring inaccuracies. If one of the bins is full, at counter reading 10 in the example shown, then, after the incrementing, the counter readings of all bins having a positive counter reading are decremented by 1. It may be determined relatively quickly, for example, in the light of the most highly filled bin, in which angle range most of the incoming cross-misalignment angles lie. Additional considerations, such as a standard deviation of the cross-misalignment angles in the bins, are also easily possible and are particularly well accessible to digital evaluation.

FIG. 3a shows an exemplary time exposure of histogram filter 300 in the operation of device 100 in FIG. 1, without the misalignment of sensors L and R. The determined cross-misalignment angle as the angular difference between the transposed directional angles lies at overwhelming frequency in the range about 0°. A great difference between the highest filled and the second highest filled bin (9 at "0°" as opposed to 5 at "+1°") points to comparatively low interference in the measurements, and thus to a high probability that a relative misalignment of sensors L and R from 0° is correct.

FIG. 3b shows an instantaneous exposure of histogram filter 300 of FIG. 3a a little later, shortly after the occurrence of a misalignment of one of sensors L, R by +2° (cf. FIG. 2). The past 6 measurements each gave an angular difference of +2°, so that the bin having the designation "2°" has reached counter reading 9, and all other bins have retained their values from FIG. 3a.

The relative misalignment that has occurred is now able to be detected with the aid of various observations. For example, two bins reaching a high counter reading simultaneously (in this case, "0°" and "+2°"), point to a misalignment that has occurred recently, especially if the bins are not adjacent. A further indication of a misalignment that has occurred exists if the bin having the highest counter reading changes, especially if there is an abrupt change. A change of speed of the filling status of the bins may also be used to detect a rapidly changing counter reading, which is able to point to a misalignment that has recently occurred. A high change of speed of the cross-misalignment angle determined from the histogram filter may also point to a misalignment that has recently occurred. The difference in the filling status of the two highest filled bins compared to another bin may also point to a relative misalignment, that has occurred, of one of sensors L and R. In general terms, a high variance or standard deviation of the filling statuses is able to point to a relative misalignment of sensors L, R. At another place (steps 415, 420), a lacking validity may be determined if the compensation angle exceeds a predetermined measure. The validity signal is formed on the basis of heuristics or a combination of the heuristics named. This may include a comparison to a previously determined threshold value. The validity signal is equivalent to a negation of the ALARM signal in FIG. 1, since an existing validity corresponds to the absence of an alarm, and vice versa.

The cross-misalignment angle may be read off from histogram filter 300 as the angle that is assigned to the bin having the highest counter reading. The counter readings of the adjacent bins may also be taken into account in determining the cross-misalignment angles. Directly adjacent bins or, in addition, also bins that are farther away may be observed, preferably the same number of bins in the rising and the falling direction, for instance, ±1 or ±2 bins. For example, an average of the angles of the observed bins may be formed as the cross-misalignment angle, the angles first being able to be weighted using the squares of the counter readings assigned to them via the bin.

Histogram filter 300 enables the determination of a relative misalignment of sensors L and R quickly and at high reliability. A low-pass filter may also be used, alternatively to histogram filter 300. A validity signal may be determined, for example, based on two low-pass filters having different time constants. If the values provided by the two low-pass filters differ by more than a predetermined measure, this indicates a relative misalignment, and the validity signal or the alarm signal is set accordingly.

Figure 4:
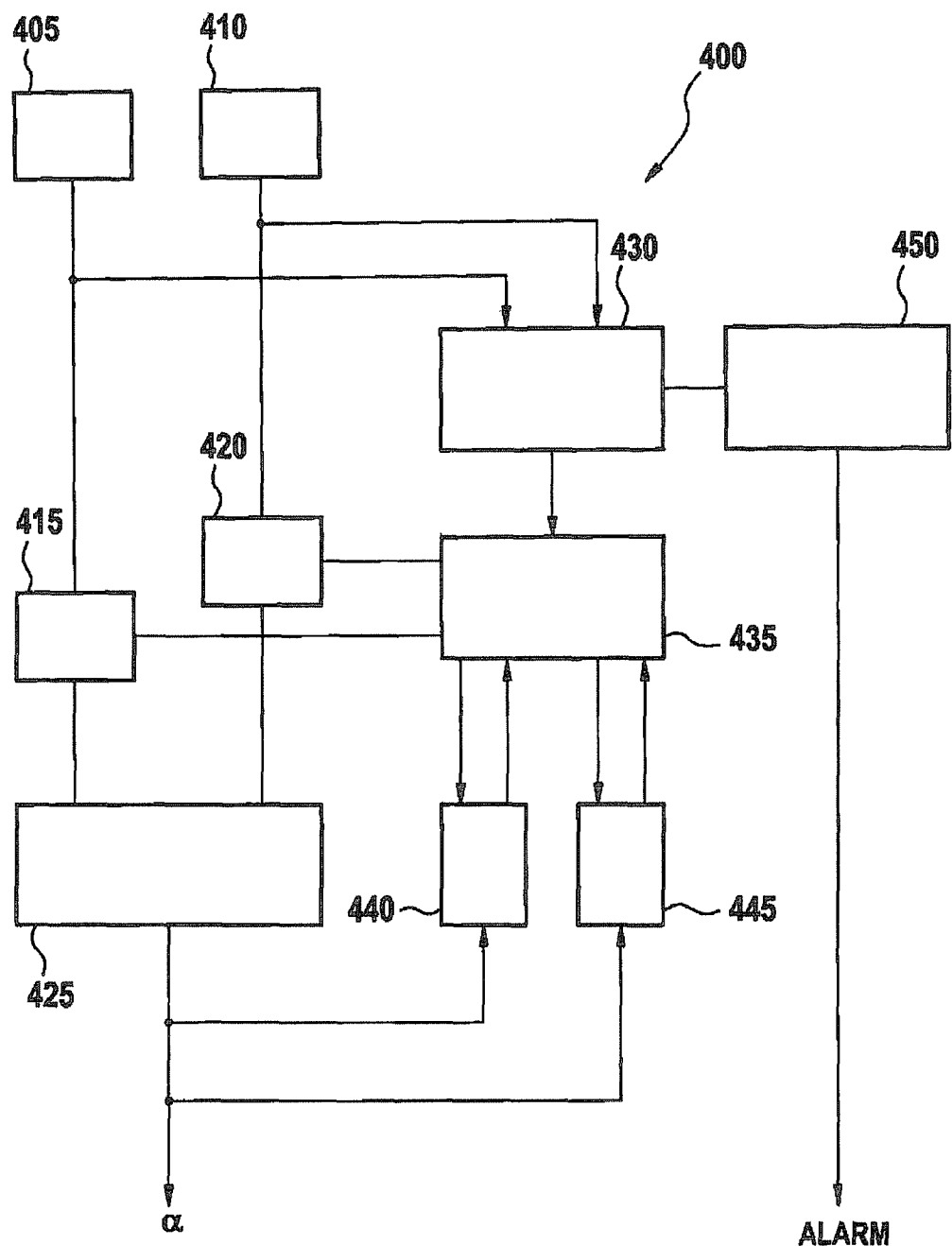
FIG. 4 shows a flow chart of a method for determining an object angle.

FIG. 4 shows a flow chart 400 of a method for determining an object angle using device 100 in FIG. 1. In steps 405 and 410, directional angles of object 220 are determined using sensors L and R of FIG. 1. In steps 415 and 420, these directional angles are corrected using compensation angles which have been determined based on a past run-through of method 400. If there are not yet any compensation angles at hand, the compensation angles may be assumed to be 0°. In a subsequent step 425, an object hypothesis α is set up, based on the compensated directional angles, which represents the angle to the object that is finally provided by method 400 and device 100. Thereafter, a position of the object is able to be determined based on the object hypothesis. Step 425 may involve transposing the incoming, compensated directional angles to a common coordinate system.

In a step 430, a cross-misalignment angle is determined by subtraction, based on the directional angles recorded in steps 405 and 410. In steps 440 and 445, system angles are determined for sensors L and R. In a step 435, compensation angles are determined for steps 415 and 420, based on the cross-misalignment angle and the system angles.

In step 435, first one-half the cross-misalignment angle is added, having different signs, to the compensated directional angles of sensors L and R. The signs, in this context, are distributed so that each directional angle is changed towards the other directional angle. In steps 440 and 445, the partially compensated directional angles created thereby are submitted, separately for each of sensors L and R, to the learning algorithm which was described above with reference to FIG. 2. Based on measurements of the same objects in different positions, the learning algorithm determines in each case a system angle for one of sensors L, R. The system angle states by what angle the partially compensated directional angle has to be corrected to achieve complete compensation.

In other words, using the all-inclusive compensating of the directional angles of sensors L, R, in each case by one-half the cross-misalignment angle, a rapid partial compensation is carried out of the relative misalignment, which is completed by the learning algorithm by a slow, but more accurate compensation, and one that is individual to each sensor, in particular. In steps 440, 445, to the extent that no system angle has yet been provided, a relative misalignment is able to be compensated for at least partially. In addition, the relative misalignment is able to be detected rapidly and reliably within the scope of the determination of the cross-misalignment angle.

In one illustrating example, the misalignment of sensor L is +3° and the misalignment of sensor R is −1°. The following table shows characteristics values of method 400 up to the complete compensation of the misalignments and up to the complete determination of the compensation angles. The difference of the misalignment angles of sensors L and R corresponds to the difference of the directional angles, but has different signs.

| Angle | Sensor L | Sensor R |
| --- | --- | --- |
| object angle | | −2° |
| angle of misalignment | +3° | −1° |
| directional angle | −5° | −1° |
| cross-misalignment angle (absolute) | | −4° |
| compensation by ½ of the cross-misalignment angle | +2° | −2° |
| partially compensated directional angle | −3° | −3° |
| system angle | +1° | +1° |
| compensation angle | +3° | −1° |
| fully compensated directional angle | −2° | −2° |

In the determination of the partially compensated directional angle, of the system angle and of the fully compensated directional angle for each sensor L and R separately, the same results are determined in each case, in the above example. If this is not the case, this points to an inappropriate assumption or an incorrect decision in a previous step, for example, a distribution of the signs of the one-half cross-misalignment angles, which does not make the determined directional angles approach each other but removes them from each other. Based on such an inconsistency, the decisions and assumptions affected may be checked and corrected, if necessary.

In a step 450, a validity signal indicating the validity of the compensation angle (and from here on, also object hypothesis a) is determined by evaluating filter 150 in FIG. 1. To do this, the observations of histogram filter 300 explained with reference to FIG. 3 may be carried out. Even in the case of an inconsistency in response to calculations (see above, with reference to the table), the validity signal may be deactivated. Driver assistance system 180 in FIG. 1 may be deactivated using the validity signal, until compensation has taken place of the misalignment angle(s).

As indicated by the arrows in flow chart 400, some of steps 405-450 may be carried out independently of one another; in particular, the frequency of carrying out the steps may be different. The cross-misalignment angle in step 430 may be determined, for example, at a higher frequency than object hypothesis a in step 425, so as to provide a quickly responding validity signal for deactivating driver assistance system 180 in FIG. 1, using little effort.

What is claimed is:

1. In a driver assistance system, a method for determining an object angle for a driver assistance system in a motor vehicle, comprising:
   determining, by a computer processor, directional angles of the object with respect to two sensors;
   determining, by the processor, the object angle based on the directional angles;
   determining, by the processor, a cross-misalignment angle as a difference of the directional angles determined;

determining, by the processor, a validity signal indicating validity of the object angle, based on the cross-misalignment angle and a histogram filter having a plurality of bins that are filled over time; and compensating, by the processor, for an influence of a misalignment of the sensors on the determined object angle based on the cross-misalignment angle.

2. The method as recited in claim 1, wherein the sensors are at a distance from each other, and, for determining the directional angles, the directional angles recorded by the sensors are transposed to a common reference system.

3. The method as recited in claim 2, wherein the object angle is determined as an average of the transposed directional angles.

4. The method as recited in claim 1, wherein the determination of the validity signal includes identifying which of the bins is a highest filled bin of the histogram filter.

5. The method as recited in claim 1, wherein a system angle is determined based on the object angles of a same object at different positions.

6. The method as recited in claim 5, wherein a system angle is added to both directional angles for compensation of remaining system angle of the sensors.

7. The method as recited in claim 1, wherein a compensation angle is determined based on object angles of the same object at different positions, and the compensation angle for compensating for relative misalignment of the sensors is added to the object angle.

8. The method as recited in claim 1, wherein the validity signal is determined based on a rate of change of the cross-misalignment angle calculated by the histogram filter.

9. The method as recited in claim 1, wherein the validity signal is determined based a variance of the cross-misalignment angle of the histogram.

10. The method as recited in claim 1, wherein the validity signal is determined based on a rate of change of a filling status of one of the bins of the histogram.

11. A device for determining an object angle for a driver assistance system in a motor vehicle, comprising:

two sensors for determining directional angles of the object;

a processing device to determine the object angle, based on the directional angles determined;

a subtraction device to determine a cross-misalignment angle from the directional angles determined;

a validator to determine a validity signal indicating validity of the object angle, based on the cross-misalignment angle and a histogram filter having a plurality of bins that are filled over time; and a compensator to compensate for an influence of a misalignment of the sensors on the determined object angle based on the cross-misalignment angle.

12. The device as recited in claim 11, wherein the sensors are at a distance from each other, the device further comprising: a transposing device to transpose directional angles recorded by the sensors into a common reference system.

13. A computer-implemented method for determining an object angle for a driver assistance system in a motor vehicle, comprising:

determining, by a computer processor, directional angles of the object with respect to two sensors;

determining, by the processor, the object angle based on the directional angles;

determining, by the processor, a cross-misalignment angle as a difference of the directional angles determined;

determining, by the processor, a validity signal indicating validity of the object angle, based on the cross-misalignment angle;

determining, by the processor, a compensation angle based on object angles of the same object at different positions; and compensating, by the processor, for an influence of a misalignment of the sensors on the determined object angle by adding the compensation angle to the object angle.

14. The computer-implemented method as recited in claim 13, wherein the validity signal is determined using a low-pass filter.

15. The computer-implemented method as recited in claim 13, wherein the validity signal is determined using two low-pass filters with different time constants.

16. The computer-implemented method as recited in claim 15, wherein the validity signal is set to indicate a misalignment response to a determination that values provided by the two low-pass filters differ by more than a predetermined measure.

* * * * *